United States Patent [19]

Milch et al.

[11] Patent Number: 4,775,799
[45] Date of Patent: Oct. 4, 1988

[54] INPUT SCANNER HAVING DIGITAL AND ANALOG MODE SELECTION

[75] Inventors: James R. Milch, Pittsford; Michael H. Davis, Marion, both of N.Y.

[73] Assignee: Eastman Kodak Company, Rochester, N.Y.

[21] Appl. No.: 111,950

[22] Filed: Oct. 23, 1987

[51] Int. Cl.⁴ ................ H01J 40/14; H04N 1/024
[52] U.S. Cl. ................................ 250/578; 358/294
[58] Field of Search .............. 250/578; 358/213.27, 358/282, 293, 294

[56] References Cited

U.S. PATENT DOCUMENTS

| Re. 32,164 | 5/1986 | Kruger | 378/19 |
|---|---|---|---|
| 4,287,441 | 9/1981 | Smith | 307/353 |
| 4,318,135 | 3/1982 | Allis et al. | 358/294 |
| 4,509,826 | 4/1985 | Araghi | 350/286 |
| 4,556,851 | 12/1985 | Levine | 329/50 |
| 4,562,467 | 12/1985 | Bradley | 358/135 |
| 4,573,070 | 2/1986 | Cooper | 358/36 |
| 4,584,656 | 4/1986 | Sakai et al. | 358/213.27 |
| 4,594,612 | 6/1986 | Levine | 358/213 |

Primary Examiner—David C. Nelms
Assistant Examiner—Stephone B. Allen
Attorney, Agent, or Firm—Donald D. Schaper

[57] ABSTRACT

An input scanner is disclosed which is adapted to scan an image on an original, such as a radiographic film, and to form a digital representation of the image. The scanner comprises a transparent platen for supporting the film, a light source under the platen, and a plurality of linear arrays of photosensitive elements located above the platen for receiving light transmitted through the film. In order to improve the signal-to-noise ratio and the dynamic range of the scanner, the signals from adjacent photosensitive elements in the arrays are processed by a combination of analog and digital summing. Different levels of spatial resolution can be selected electronically without changing the physical disposition of the scanner elements.

9 Claims, 4 Drawing Sheets

INPUT SCANNER HAVING DIGITAL AND ANALOG MODE SELECTION

BACKGROUND OF THE INVENTION

1. Field of the Invention

The present invention relates to an input scanner, and more particularly, to the processing of signals in such a scanner.

2. State of the Prior Art

It is known in the prior art to use a linear CCD imager to scan films, such as a radiographic film, to produce a digital record. The film is illuminated at a scanning station by a line source, and it is projected with large demagnification onto the much smaller imager. The film is scanned line by line as it is moved slowly past the scanning station. Because of the clinical significance of unusual details in a radiographic film, there can be very little tolerance for artifacts. Thus, ways have been sought to eliminate the artifacts and increase the resolution in the image. One approach has been to use multiple imagers to provide higher pixel data rates than a single imager can handle.

The signal-to-noise ratio of the data generated by the imagers depends primarily on the level of noise in the analog signal from the CCD imager. Several types of digital signal averaging have been used to reduce the noise level in imaging systems and to improve the dynamic range. One of the most common techniques involves capturing a line of the image several times and adding together the digital results for corresponding pixels. This is a simple and convenient way to improve dynamic range, but the gains are proportional to the square root of the number of samples, and the taking of a number of samples slows the process considerably. A less commonly used method is to sum the digital values of pixels in the line itself; however, this is a relatively expensive way to obtain a better image.

SUMMARY OF THE INVENTION

It is an object of the present invention to overcome the problems in the prior art and to provide an input scanner having an improved signal-to-noise ratio and an improved dynamic range.

In accordance with one aspect of the present invention, there is provided an input scanner for forming a digital representation of an image, the input scanner comprising: means for producing a series of image signals indicative of luminous energy from individual pixels of the image; means for processing the signals including means for monitoring the level of the signals and means for summing the signals, and the summing means including means for summing the signals in a digital mode when the level of the signals is above a predetermined level and means for summing the signals in an analog mode when the level of the signals is below a predetermined level.

In one embodiment of the invention, an input scanner comprises four linear arrays of photosensitive elements and optical means for forming an image of a film on the arrays. Multiple photosites in the arrays are provided for each pixel on the film. A combination of analog and digital summing of signals from adjacent photosites is used to process the signals.

A principal advantage of the present invention is that there is an improvement over known scanners in both Dynamic range and signal-to-noise ratio. This improvement is accomplished through the use of a combination of digital and analog summing of the signals from adjacent photosites in the CCD imager. Much of the noise contributed by the output amplifier in prior-art systems is eliminated through the use of analog summing. Further advantages are that the scanner can operate at different resolutions without changing any optical elements of the scanner, and the scanner can be made more compact because of the optical arrangement used in the scanner.

Other features and advantages will become apparent with reference to the following Description of the Preferred Embodiment when read in light of the attached drawings.

DESCRIPTION OF A PREFERRED EMBODIMENT

As used herein, the term "dynamic range" refers to the range of optical densities in a film over which acceptable measurements can be made. The term "signal-to-noise ratio" (SNR) is used to indicate the noise in a measurement at a particular film density. An improved dynamic range refers to an increase in the density range which can be measured, and an improved SNR refers to a higher SNR at densities normally encountered in a radiographic film.

Figure 1:
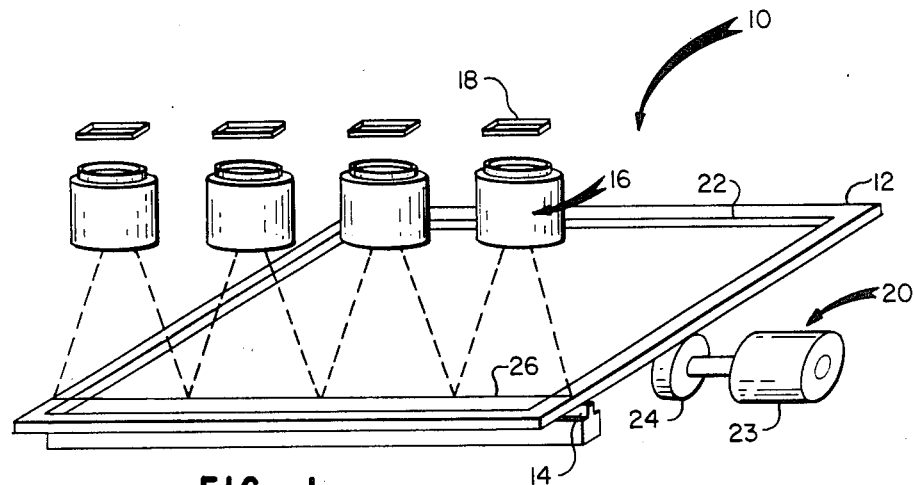
FIG. 1 is a perspective view of the scanner of the present invention.

With reference to FIG. 1, there is shown an input scanner 10 constructed in accordance with the present invention. Scanner 10 comprises a platen 12 which is formed of a transparent material such as glass of a clear plastic, a light source 14, four optical elements 16, four linear arrays 18, and a drive mechanism 20 for moving platen 12 relative to arrays 18 to scan an original such as a radiographic film 22. Light source 14 can be any linear light source, for example, a fiber optic bundle spot-to-line converter (not shown) which is illuminated by a tungsten lamp. Drive mechanism 20 includes a stepper motor 23 and a feed roller 24. Other drive mechanisms can be used, for example, a screw drive.

Figure 6:
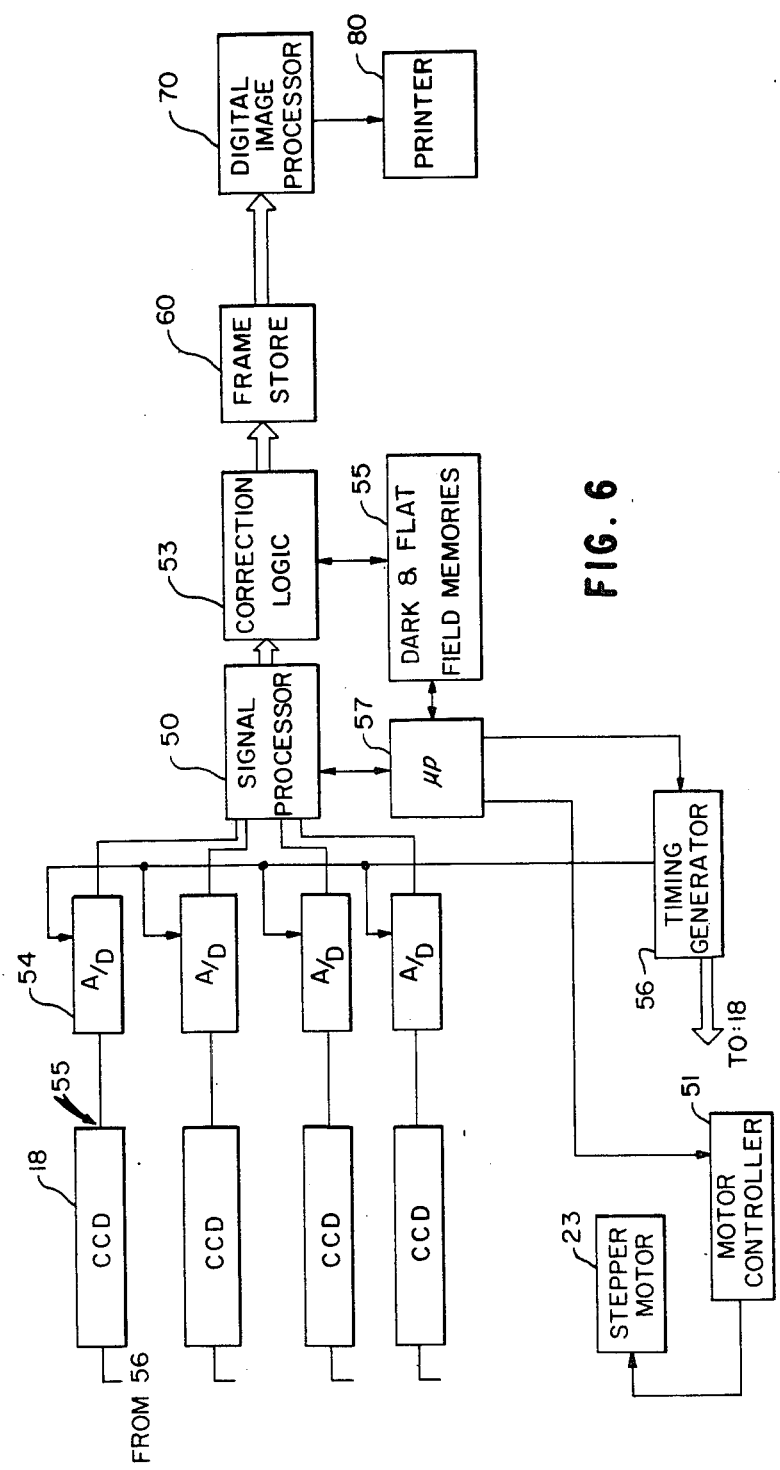
FIG. 6 is a block diagram of the electronic elements of the scanner.

As shown in the exemplary arrangement in FIG. 1, a film 22 is supported on platen 12 and is scanned line by line as it is moved past the arrays 18 by drive mechanism 20. As will be explained in more detail hereinafter, the pixels produced by scanner 10 can be delivered to an output device, such as a printer 80 (FIG. 6). The scanning arrays 18 are optically combined, as indicated in FIG. 1, to cover a full scan line 26.

Figure 2:
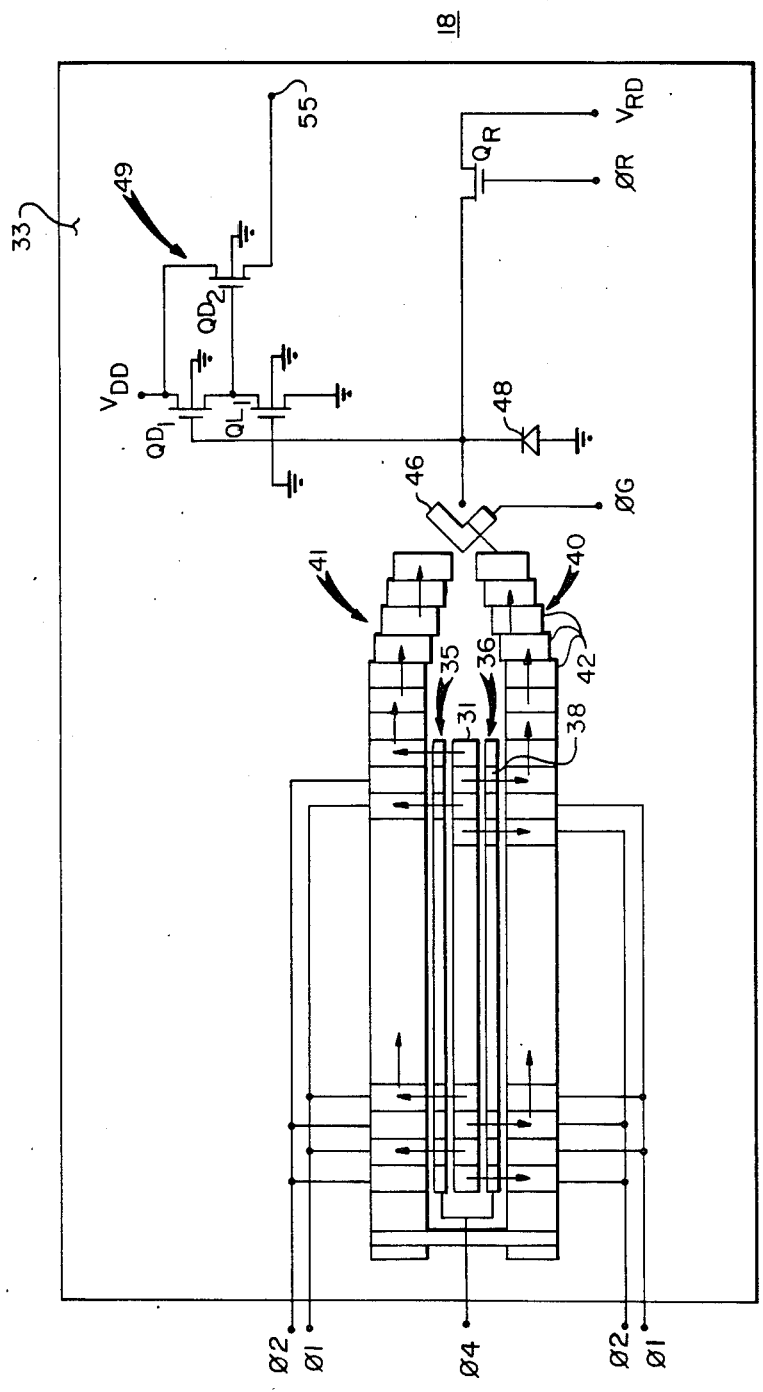
FIG. 2 is a schematic view of one of the linear arrays.

The scanning arrays 18 can be of the CCD type, and an exemplary array 18 is shown in FIG. 2. As shown in FIG. 2, an array 18 comprises a series of photosensitive elements 31 on a center portion of a silicon chip 33. Elements 31 are flanked on either side by rows 35, 36, of transfer gates 38. Registers 40, 41, which comprise parallel input and serial output analog registers, are disposed on either side of the rows 35, 36, of transfer gates 38.

Transfer gates 38 switch the output of the individual photosensitive elements 31 to phase gates 42 of shift registers 40, 41. The total number of phase gates 42 in shift registers 40, 41, is equal to the number of photosensitive elements 31 that comprise each array, and as a result, only alternate shift register phase gates are coupled to the photosensitive elements 31. The number of transfer gates 38 used in each row 35, 36, is equal to one half the total number of elements 31 with alternate, e.g., odd numbered elements 31 coupled through gates 38 of row 36 to shift register 40 and even numbered elements 31 coupled through transfer gates 38 of row 35 to shift register 41.

Arrays 18 function to convert the graphical image on a film 22 to a series of electronic image signals. On exposure of the photosensitive elements 31 to the illuminated film 22 over a preset time interval (termed the integration period), a charge proportional to the luminous energy transmitted through the film 22 is generated. Following integration, the charges on the photosensitive elements 31 are transferred en masse to phase gates 42 of shift registers 40, 41, upon enablement of transfer gates 35, 36 by a transfer signal $\theta$-A.

Following transfer of the charges from the charge coupled cells to alternate gates of registers 40, 41, the resulting image signals are shifted by means of clock driving pulses $\theta$-1 and $\theta$-2 serially along registers 40, 41, (i.e. from left to right in FIG. 2) to output gate 46.

In response to removal of a reset pulse $\phi R$ from transistor $Q_R$, the transistor $Q_R$ is turned off and charge is transferred from output gate 46 to a charge storage diode 48. Diode 48 is connected to the gate electrode of transistor $QD_1$ in the first stage of a two-stage-source-follower output amplifier 49. In the first stage, transistor $QD_1$ and a transistor $QL_1$ continuously operate in a saturated mode. At the electrical junction of the transistors $QD_1$ and $QL_1$, a voltage is produced which follows the voltage level across the diode 48; this voltage is applied as an input to the gate electrode of transistor $QD_2$. The drain of transistor $QD_2$ is connected to a potential source $V_{DD}$ which is also coupled to the drain of transistor $QD_1$. Output 55 of array 18 is taken from the source electrode of transistor $QD_2$ and is delivered to an analog-to-digital converter 54, as shown in FIG. 6. When the reset pulse $\phi R$ is applied, the transistor $Q_R$ is turned on and the potential across the diode 48 returned to a reference level set by $V_{RD}$. As will be apparent from the discussion which follows, the application of the reset pulse $\phi R$ is timed according to whether or not analog summing occurs at storage diode 48.

With reference to FIG. 6, a single analog-to-digital converter 54 is connected to the output 55 of each CCD array 18. Each of the A/D converters 54 is a 12 bit digitizer (4095 gray levels). In the practice of the present invention, the signal-to-noise ratio and the dynamic range of the image data are improved by a combination of analog and digital summing of the signals from adjacent photosensitive elements 31 (photosites) in the CCD array 18. A signal processor 50, under the control of a microprocessor 57, receives the signals from A/D converters 54 and processes the signals to determine the summing mode. Signal processor 50 includes an arithmetic unit, for example, a Model L4C381 obtainable from Logic Devices, for performing the summing and logic functions in accordance with well known techniques. Microprocessor 57 can be, for example, a Motorola 68020 microprocessor. More photosensitive elements 31 are provided in the image plane than are necessary for the lowest resolution required. At points in the image where the optical density of the film is high, the charges from adjacent elements 31, for example four adjacent elements 31, are summed in analog mode in the array 18 and then digitized. This result is identified as the signal from a single film pixel. At points in the image where the optical density is low, the charges from adjacent photosites are individually digitized and then summed as digital numbers. This result is also identified as the signal from a single film pixel.

The same amount of light can be provided on several photosites at low demagnification as can be provided on a single photosite at high demagnification. Thus, the basic analog signal and the noise from a single photosite are the same in the two cases. Noise varies as a function of signal in one way for analog summing and in a different way for digital summing. Analog summing gives the same noise as the reference condition and M (no. of photosites or samples) times the signal; thus, for a maximum signal S and a noise in the dark N, the sum of M such samples will result in a maximum signal of $M \times S$ and a noise in the dark of equal to N. In digital summing, if one starts with a maximum signal S and a noise in the dark N, the sum of M such samples will result in a maximum signal of $M \times S$ and a noise in the dark equal to $\sqrt{M} \times N$. It is apparent that analog summing should be used whenever possible. A decision must be made as to the type of summing to be used for each pixel as it is read out. One of the characteristics of a CCD imager is that much of the noise is contributed by the output amplifier, and because of this characteristic, it is desirable to sum the charge packets from several pixels before they reach the amplifier.

Figure 3:
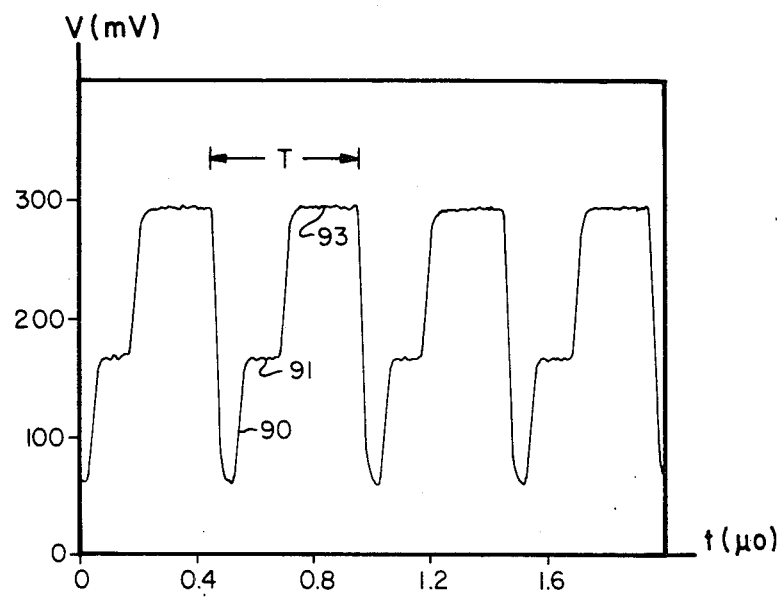
FIGS. 3 and 4 are representations of the waveforms produced in the digital mode and in the analog mode, respectively.
Figure 4:
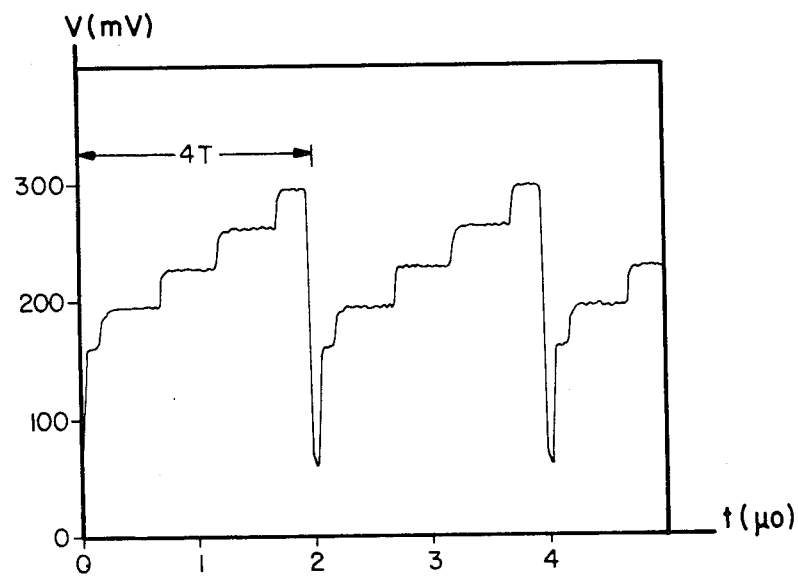

Graphical representations of the waveforms which result in digital summation and in analog summation are shown respectively in FIGS. 3 and 4. As shown in FIG. 3, each period T consists of an interval 90 during reset pulse $\phi R$, followed by an interval 91 in which no video signal is present and the output settles to the reference level, followed by an interval 93 during which the video signal is present. In the digital mode, four such periods T are summed. With reference to FIG. 4, the waveform produced in the analog mode is shown in which the video signals from four periods T are summed. The four signals are accumulated at storage diode 48 in array 18, and then passed to the amplifier 49.

Figure 5:
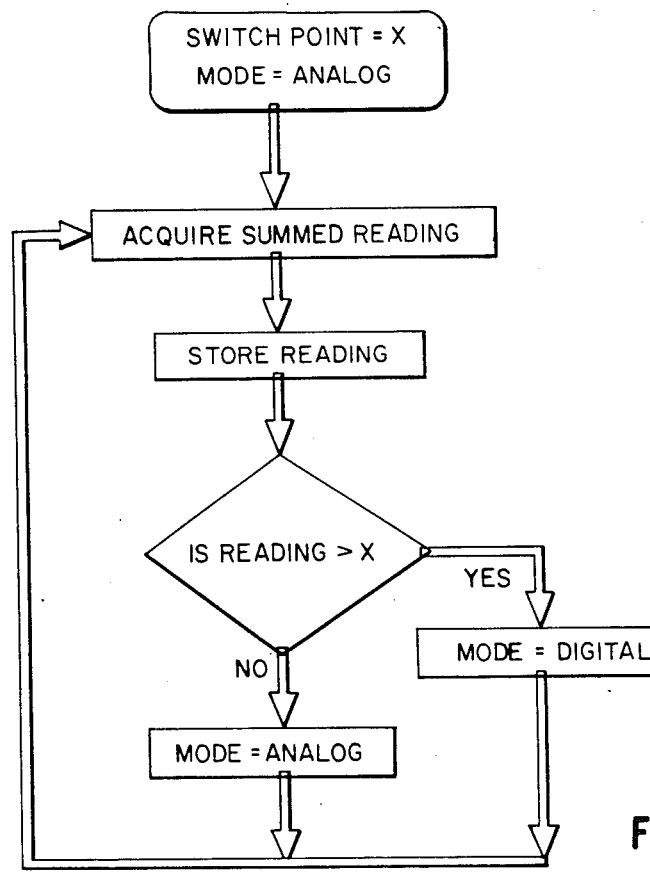
FIG. 5 is a flow chart of steps involved in determining whether to sum in the digital mode or in the analog mode.

The decision as to whether to sum in the analog or digital mode is made on a pixel-by-pixel basis by electronic monitoring of the output of array 18. The monitoring of the array output is performed in the ALU (not shown) of microprocessor 57 in accordance with a program stored in memory. A flow chart of the steps performed in the program is shown in FIG. 5. In a first step, a summed reading of four elements is acquired and stored. The summed reading is then compared with a stored predetermined value designated "x" which is proportional to the amount of charge which can be held in array 18. If the summed reading is greater than x, the next four elements will be summed in the digital mode, and if the summed reading is less than x, the next four elements will be summed in the analog mode in the array 18. The summing determination for a particular pixel is actually based on the summed value of the preceding pixel, and for most applications this produces excellent results. However, it will be apparent to those skilled in the art that it would be possible with appropriate circuitry to monitor the charges in the CCD and to base the summing determination for a pixel on the amount of charge in that pixel.

The microprocessor 57 provides the control signals to a controller 51 and to a timing generator 56. Timing generator 56 provides timing signals to the arrays 18 and the A/D converters 54. The digital values of successive pixels are corrected by correction logic 53 for dark level and gain ("flat") variations in accordance with calibration values obtained from on-line measurements and stored in dark and flat field memory chips represented by box 55 in FIG. 6. The corrected digital values of successive pixels are then stored in a frame store 60.

When it is desired to reproduce an image stored in frame store 60, the stored pixel values are delivered to a digital image processor 70. The digital image processor 70 delivers the values to a printer 80 or to another output device (not shown). Processor 70 may function in accordance with image enhancing algorithms, for example, algorithms directed to unsharp masking and feature extraction.

Another feature of the present invention is that several levels of spatial resolution can be selected electronically without changing the physical disposition of optical components. Thus, for example, instead of summing the signals from four photosites, the signals from two photosites could be summed to produce twice as many pixels and substantially increase the resolution. In all cases, the speed at which the film 22 is moved past the scanning station is carefully controlled and must be varied to match the averaging and sampling conditions. When the resolution is increased, the speed of the film is decreased by an amount sufficient to compensate for the additional processing time.

The invention has been described in detail with particular reference to a preferred embodiment thereof, but it will be understood that variations and modifications can be effected within the spirit and scope of the invention. For example, although the scanner 10 has been disclosed as working in a transmissive mode, it could also operate in a reflective mode.

We claim:

1. An input scanner for forming a digital representation of an image, said input scanner comprising:
   means for producing a series of image signals indicative of luminous energy received from individual pixels of said image; and
   means for processing said signals including means for monitoring the level of said signals and means for summing said signals, and said summing means including means for summing said signals in a digital mode when the level of said signals is above a predetermined level and means for summing said signals in an analog mode when the level of said signals is below a predetermined level.

2. An input scanner, as defined in claim 1, wherein said means for producing a series of image signals comprises an array of photosensitive elements.

3. An input scanner, as defined in claim 2, wherein said means for summing said signals in the analog mode comprises charge storage means in said array.

4. An input scanner comprising:
   a linear array of photosenstive elements;
   means for supporting an original to be scanned;
   means for effecting relative movement between said original and said array;
   a light source for directing a light beam onto said original;
   optical means for focussing light from said original to said array; and
   means for processing signals from said array to produce a digital representation of an image on said original, said processing means including means for detecting the level of signal from individual pixels of said image and means for summing said signals in analog form if said signals are below a predetermined level and for summing the signals in digital form if the signals are above said level.

5. An input scanner, as defined in claim 4, wherein said scanner includes a plurality of arrays disposed along a straight line.

6. An input scanner, as defined in claim 5, wherein each of said arrays has optical means associated therewith.

7. An input scanner, as defined in claim 6, wherein said support means includes a transparent platen for supporting said original, and said light source is located under said platen.

8. An input scanner, as defined in claim 7, wherein each of said arrays is a CCD array.

9. An input scanner for forming a digital representation of an image on an original, said input scanner comprising a linear array of photosensitive elements, said elements being adapted to produce a series of image signals indicative of the luminous energy received from individual pixels of said original, means for processing said signals characterized in that said processing means includes means for monitoring the level of said signals, means for summing said signals, and said summing means including means for summing said signals in a digital mode when the level of said signals is above a predetermined level and means for summing said signals in an analog mode when said signals are below a predetermined level

* * * * *